(12) United States Patent
Abu Al-Rubb

(10) Patent No.: US 10,492,383 B2
(45) Date of Patent: Dec. 3, 2019

(54) IRRIGATION DEVICE

(71) Applicant: Khalil Mahmoud Abu Al-Rubb, London (GB)

(72) Inventor: Khalil Mahmoud Abu Al-Rubb, London (GB)

(*) Notice: Subject to any disclaimer, the term of this patent is extended or adjusted under 35 U.S.C. 154(b) by 220 days.

(21) Appl. No.: 15/506,694

(22) PCT Filed: Aug. 26, 2015

(86) PCT No.: PCT/EP2015/069554
§ 371 (c)(1),
(2) Date: Feb. 24, 2017

(87) PCT Pub. No.: WO2016/030423
PCT Pub. Date: Mar. 3, 2016

(65) Prior Publication Data
US 2017/0238482 A1    Aug. 24, 2017

(30) Foreign Application Priority Data

Aug. 29, 2014 (LU) .......................... 92532

(51) Int. Cl.
*A01G 25/00* (2006.01)
*A01G 9/24* (2006.01)
*A01G 31/02* (2006.01)
*B01D 61/36* (2006.01)
*C02F 1/44* (2006.01)
(Continued)

(52) U.S. Cl.
CPC ............. *A01G 25/00* (2013.01); *A01G 9/243* (2013.01); *A01G 31/02* (2013.01); *B01D 61/364* (2013.01); *B01D 61/366* (2013.01); *C02F 1/447* (2013.01); *A01G 2009/248* (2013.01);
(Continued)

(58) Field of Classification Search
CPC ........ A01G 25/00; A01G 25/06; A01G 9/243; A01G 9/245; A01G 9/24; A01G 9/247; A01G 29/00; A01G 31/02
See application file for complete search history.

(56) References Cited

U.S. PATENT DOCUMENTS 3,369,541 A * 2/1968 Thomason ............ F24F 5/0046
126/400
4,111,189 A * 9/1978 Dizon .................... C09K 5/063
126/400
(Continued)

FOREIGN PATENT DOCUMENTS

DE        2924653 A1 *  1/1981
DE   202004017061        3/2005
(Continued)

OTHER PUBLICATIONS

International Search Report and Written Opinion for Application No. PCT/EP2-15/069554 dated Dec. 4, 2015 (11 pages).

*Primary Examiner* — Kristen C Hayes
(74) *Attorney, Agent, or Firm* — Michael Best & Friedrich LLP

(57) ABSTRACT

An irrigation device (10) including a solar collector (18) connected to a heating element (14). The heating element is embedded in a hydrated medium and heats this to produce water vapour. A semi-permeable membrane (34) allows the heated water vapour to be used for irrigation, thereby allowing marsh or sea water to be used to irrigate large tracts of arid soil.

11 Claims, 2 Drawing Sheets

(51) Int. Cl.
    *C02F 101/10*     (2006.01)
    *C02F 103/06*     (2006.01)
    *C02F 103/08*     (2006.01)

(52) U.S. Cl.
    CPC ...... *C02F 2101/10* (2013.01); *C02F 2103/06* (2013.01); *C02F 2103/08* (2013.01)

(56) References Cited

U.S. PATENT DOCUMENTS

| | | | |
|---|---|---|---|
| 4,125,963 A | | 11/1978 | Johnson |
| 4,193,543 A | * | 3/1980 | Viesturs ................ F24D 11/003 |
| | | | 126/400 |
| 4,269,170 A | * | 5/1981 | Guerra ................... F24S 60/00 |
| | | | 126/619 |
| 4,412,527 A | * | 11/1983 | Fujie ...................... A01G 9/243 |
| | | | 126/400 |
| 4,416,260 A | * | 11/1983 | Proctor ................. A01G 9/243 |
| | | | 126/618 |
| 5,522,970 A | * | 6/1996 | Shimizu ................ A01G 25/00 |
| | | | 202/197 |
| 5,598,661 A | * | 2/1997 | Eiderman ............. A01G 9/247 |
| | | | 47/48.5 |
| 8,800,202 B2 | * | 8/2014 | Rusiniak ............... A01G 9/243 |
| | | | 47/1.4 |

FOREIGN PATENT DOCUMENTS

| | | |
|---|---|---|
| EP | 0657387 | 6/1995 |
| JP | 2004194585 | 7/2004 |
| JP | 2009171906 | 8/2009 |

\* cited by examiner

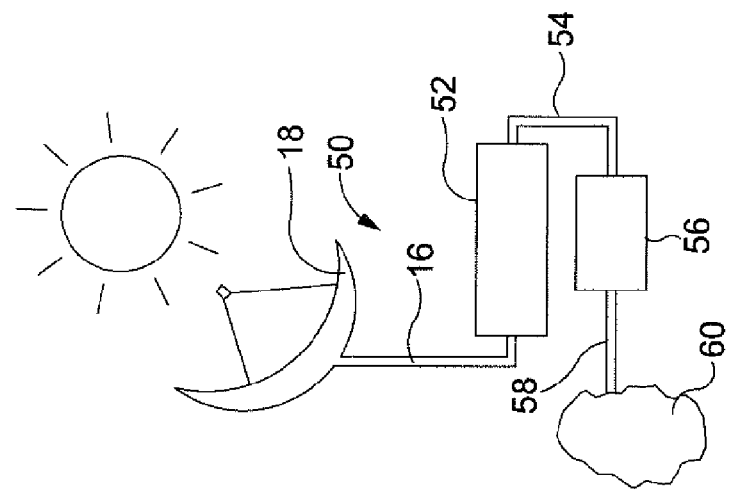
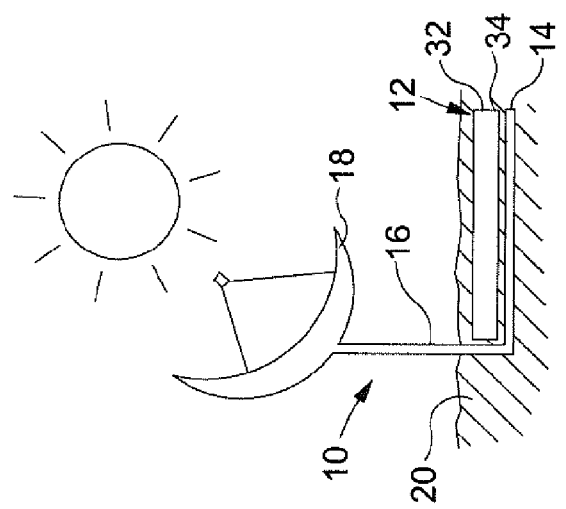

IRRIGATION DEVICE

TECHNICAL FIELD

Embodiments of the invention relate to a device for irrigating land.

BACKGROUND

A small proportion of the earth's surface is suitable for cultivation and much of this is due to the lack of water or the lack of suitable irrigation water due to the presence of impurities. In particular, there are large swathes of land in the Middle East where the salinity of the water which is present prevents any cultivation.

For example, Sabkahs (or salt flats) are large areas with ample access to water, and nutrient-rich soil, but where the salinity of the water prevents the cultivation of these areas.

It is desirable to create a system whereby these, and other arid areas, can be cultivated to support agriculture.

SUMMARY

According to a first aspect, the invention provides an irrigation device comprising a solar collector for collecting solar energy; a growing chamber and a heating element, the heating element being adapted to be in thermal contact with water having impurities, the growing chamber and the heating element being separated by a membrane; the irrigation device further comprising a heat conduit for transferring heat from the solar collector to the heating element to thereby cause the water to move across the membrane; the membrane being permeable to water, but impermeable to said impurities so that the impurities remain whereas the water moves to the growing chamber. The membrane may further be permeable to steam and/or vapour.

The solar collector may be a parabolic solar collector or a solar vacuum tube.

The growing chamber may be used for hydroponics.

The water may be moved across the membrane by reverse osmosis.

The water may move across the membrane by conversion to vapour.

The membrane may prevent a flow of water out of the growing chamber.

The irrigation device according to any preceding claim wherein the heat conduit is a food-grade heat transfer fluid.

The heating element may be adapted to be inserted into the ground.

The irrigation device may further comprise a hydration chamber comprising said heating element, the hydration chamber being adapted to receive water comprising impurities from an external source. In this case, the heating element may heat the water thereby causing evaporation or distillation. The external source may be the sea. In further embodiments, the source may be internal, for example, the ground water from the marshland and/or a water reservoir where the water has been transported from an external source. The growing chamber may comprise a coolant. The coolant may be sea water or air.

The growing chamber may comprise an upper barrier. The upper barrier may be mulch. The upper barrier may be perforated. The upper barrier may be a material which reduces the rate at which water or water vapour can move through the material, meaning the material has the ability to retard or retain the diffusion of water and water vapour from the growing chamber.

The irrigation device may further comprise a system for aerating the growing chamber.

The water having impurities may be sourced from any source of unrefined natural water such artesian wells with higher salt content or water from salt or salty lakes.

DESCRIPTION OF ACCOMPANYING FIGURES

Embodiments of the invention are described with reference to the accompanying schematic diagrams where:

FIG. 1 is a schematic diagram of an irrigation device according to a first embodiment of the invention;

FIG. 2 is a schematic diagram of an irrigation device according to a second embodiment of the invention.

DESCRIPTION OF EMBODIMENTS

Figure 3:
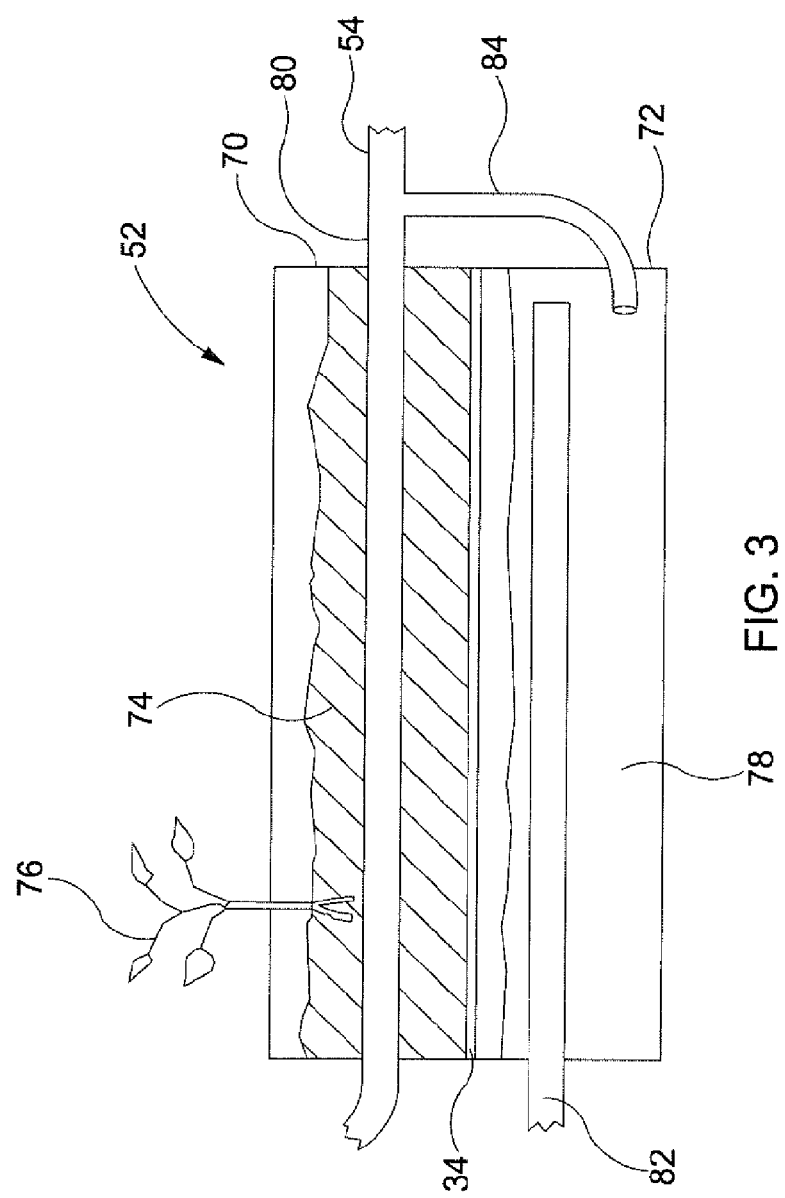
FIG. 3 is a schematic diagram of a detail of the irrigation device of FIG. 2.

Embodiments of the invention are described hereafter with reference to the accompanying diagrams.

FIG. 1 illustrates an irrigation device 10 according to an embodiment of the invention. The irrigation device 10 comprises a growing chamber 12 and a heating element 14. The heating element 14 includes a heat conduit 16 connected to a solar collector 18.

A suitable solar collector is the SolarBeam™ product manufactured by SolarTron Energy Systems Inc.

In this embodiment, the heat conduit 16 comprises a plurality of thermally conductive and non-thermally conductive pipes filed with a food-grade heat transfer fluid to ensure that heat collected by the solar collector 18 is transferred to the heating element 14. A suitable heat transfer fluid is manufactured by Paratherm under the Paraferm HF®, Paraferm MR® and Paraferm LR® marks, but embodiments of the invention are not so limited. In further embodiments any suitable heat transfer fluid is used.

In this embodiment the heating element 14 comprises the lower conduit made of a thermally conductive material (such as metal or a suitable plastic).

The heating element is placed in the ground 20.

The growing chamber 12 in this embodiment is constructed from a box 32 made of suitable material which is impermeable to water but permeable to steam. It is to be realised that the box can also be a pit dug out in the ground. The pit is then lined with a steam-permeable film. The pit is then filled with earth or other substrates on which plants may be cultivated. It is to be realised that the substrates will depend on the type of plants to be cultivated. In certain embodiments, irrigation devices are used for hydroponic farming and in this case, the box or pit is filled with suitable nutrients.

However, in the preferred arrangement, the box 32 is filled with the same ground in which it is placed.

The top of the box may be removed, but in hot and dry environments, it is preferable to retain the top of the box as an upper barrier and then provide perforations in the top through which the plants may grow. This has the advantage of reducing moisture loss due to evaporation.

In a further embodiment, mulch provides an upper barrier to prevent evaporation to the atmosphere, but allow the plants to grow.

In embodiments of the invention, the box 32 may be any container in which the required substrate for cultivation may be contained.

The bottom of the box forming the growing chamber 12 is formed by a membrane 34. Importantly, the membrane allows water vapour to move into the box 32 through the membrane, but does not allow water vapour to exit through the membrane. A suitable membrane is the Roofsheild product produced by the Proctor Group Ltd. It is to be realised however that any suitable membrane for this purpose can also be used.

In an alternate embodiment a second membrane or cover may be provided to allow sunlight but prevent evaporation to escape from the box.

The bottom of the box 32 formed by membrane 34 is placed close to the heating element 14. In this case, the membrane 34 is close enough so that the heating element 14 heats up water in the ground 20 to form water vapour. The water vapour then passes through the membrane 34 and into the box 32. Since the membrane is semi-permeable, the water is unable to pass back out again.

Typically, the irrigation device 10 is located in ground which has a high salt-content. Therefore any water in the ground will have a relatively high concentration of dissolved salts. By heating the water so that water vapour is created, the salts remain behind. In this manner, it is possible to irrigate the ground with the water which is already present.

FIG. 2 is a schematic illustration of an irrigation device 50 according to a further embodiment of the invention. The irrigation device 50 of FIG. 2 is similar to the irrigation device 10 of FIG. 1 and similar reference numerals are used to denote similar features. The irrigation device 50 comprises a solar collector 18 connected to a heat conduit 16. The heat conduit 16 is connected to a germination chamber 52 which is illustrated in FIG. 3 and described in more detail below.

The germination chamber 52 is further connected to a cooling pipe 54 which is connected to a pump 56. A flow pipe 58 connects the pump 56 to the sea 60. By operation of the pump 56 sea water from the sea 60 is transported to the germination chamber 52 and back again.

FIG. 3 is a schematic illustration of the germination chamber 52 of FIG. 2. The germination chamber 52 comprises a growing chamber 70 and a hydration chamber 72. The growing chamber 70 is separated from the hydration chamber 72 by semipermeable membrane 34.

The hydration chamber in this embodiment includes a sponge 78. Sponge 78 finds application for hydroponics, but the invention is not so limited. In further embodiments a lower layer of marshland may be provided in place of the sponge 78. A heating element 82 is also provided in the hydration chamber 72 and is embedded in the sponge. In the same manner as described with reference to FIG. 1, the heating element 82 is connected to the heat conduit 16 (FIG. 2) and heat collected by the solar collector 18 is transmitted by the heating element 82.

The cooling pipe 54 illustrated in FIG. 1 here branches into a cooling pipe 80 and a hydration pipe 84. The hydration pipe 84 delivers sea water to the sponge 78 of the hydration chamber. As the heat from the heating element 82 causes evaporation of the water in the sponge 78, this is replaced by sea water delivered to the sponge 78 by the hydration pipe 84.

The growing chamber 70 includes a growing substrate 74 which may be hydroponic or may be normal soil. The choice of the substrate will depend on the materials available and what crops it is desired to cultivate.

The cooling pipe 80 transports a coolant (which is cooler sea water here) through the growing substrate 74 thereby encouraging condensation of the water vapour passing through the semi-permeable membrane 34.

In this manner sea water can be used to irrigate large tracts of land, in particular since the irrigation only relies on the energy available in the form of solar energy is which often abundant in those areas requiring irrigation. Other forms of water having impurities may be used instead of sea water.

Similarly, although the embodiment of FIGS. 2 and 3 uses sea water for both hydration and cooling, in further embodiments, different fluids are used for these two functions. For example, the coolant may be air.

Although embodiments of the invention have been described with the condensation of water, this is not the only method whereby water can pass across the semi-permeable membrane. In further embodiments, the energy collected by the solar collectors is used to drive reverse osmosis.

Furthermore, it is to be realised that the term 'solar collector' can mean solar dish, solar vacuum tubes or solar photovoltaic cells, or any other known technology for collecting and converting solar energy.

The invention claimed is:

1. An irrigation device comprising a solar collector for collecting solar energy; a growing chamber and a heating element, the heating element being adapted to be in thermal contact with water having impurities, the growing chamber and the heating element being separated by a semi-permeable membrane; the irrigation device further comprising a heat conduit for transferring heat from the solar collector to the heating element to thereby cause water vapour to move across the membrane; the membrane being permeable to water vapour, but impermeable to said impurities so that the impurities remain whereas the water moves to the growing chamber, wherein the heating element is adapted to be inserted into the ground, and wherein the solar collector is a parabolic solar collector.

2. An irrigation device comprising a solar collector for collecting solar energy; a growing chamber and a heating element, the heating element being adapted to be in thermal contact with water having impurities, the growing chamber and the heating element being separated by a semi-permeable membrane; the irrigation device further comprising a heat conduit for transferring heat from the solar collector to the heating element to thereby cause water vapour to move across the membrane; the membrane being permeable to water vapour, but impermeable to said impurities so that the impurities remain whereas the water moves to the growing chamber, wherein the heating element is adapted to be inserted into the ground, and wherein the solar collector is a solar vacuum tube.

3. An irrigation device comprising a solar collector for collecting solar energy; a growing chamber and a heating element, the heating element being adapted to be in thermal contact with water having impurities, the growing chamber and the heating element being separated by a semi-permeable membrane; the irrigation device further comprising a heat conduit for transferring heat from the solar collector to the heating element to thereby cause water vapour to move across the membrane; the membrane being permeable to water vapour, but impermeable to said impurities so that the impurities remain whereas the water moves to the growing chamber, wherein the heating element is adapted to be inserted into the ground, and wherein water is moved across the membrane by distillation.

4. An irrigation device comprising a solar collector for collecting solar energy; a growing chamber and a heating element, the heating element being adapted to be in thermal contact with water having impurities, the growing chamber and the heating element being separated by a semi-permeable membrane; the irrigation device further comprising a heat conduit for transferring heat from the solar collector to the heating element to thereby cause water vapour to move across the membrane; the membrane being permeable to water vapour, but impermeable to said impurities so that the impurities remain whereas the water moves to the growing chamber, wherein the heating element is adapted to be inserted into the ground, and wherein water moves across the membrane by conversion to vapour.

5. An irrigation device comprising a solar collector for collecting solar energy; a growing chamber and a heating element, the heating element being adapted to be in thermal contact with water having impurities, the growing chamber and the heating element being separated by a semi-permeable membrane; the irrigation device further comprising a heat conduit for transferring heat from the solar collector to the heating element to thereby cause water vapour to move across the membrane; the membrane being permeable to water vapour, but impermeable to said impurities so that the impurities remain whereas the water moves to the growing chamber, wherein the heating element is adapted to be inserted into the ground, and wherein the membrane prevents a flow of water out of the growing chamber.

6. An irrigation device comprising a solar collector for collecting solar energy; a growing chamber and a heating element, the heating element being adapted to be in thermal contact with water having impurities, the growing chamber and the heating element being separated by a semi-permeable membrane; the irrigation device further comprising a heat conduit for transferring heat from the solar collector to the heating element to thereby cause water vapour to move across the membrane; the membrane being permeable to water vapour, but impermeable to said impurities so that the impurities remain whereas the water moves to the growing chamber, and wherein the heating element is adapted to be inserted into the ground, the irrigation device further comprising a hydration chamber comprising said heating element, the hydration chamber being adapted to receive water comprising impurities from an external source.

7. An irrigation device comprising a solar collector for collecting solar energy; a growing chamber and a heating element, the heating element being adapted to be in thermal contact with water having impurities, the growing chamber and the heating element being separated by a semi-permeable membrane; the irrigation device further comprising a heat conduit for transferring heat from the solar collector to the heating element to thereby cause water vapour to move across the membrane; the membrane being permeable to water vapour, but impermeable to said impurities so that the impurities remain whereas the water moves to the growing chamber, wherein the heating element is adapted to be inserted into the ground, and wherein the growing chamber comprises a coolant.

8. The irrigation device according to claim 7 wherein the coolant is sea water.

9. The irrigation device according to claim 7 wherein the coolant is air.

10. An irrigation device comprising a solar collector for collecting solar energy; a growing chamber and a heating element, the heating element being adapted to be in thermal contact with water having impurities, the growing chamber and the heating element being separated by a semi-permeable membrane; the irrigation device further comprising a heat conduit for transferring heat from the solar collector to the heating element to thereby cause water vapour to move across the membrane; the membrane being permeable to water vapour, but impermeable to said impurities so that the impurities remain whereas the water moves to the growing chamber, wherein the heating element is adapted to be inserted into the ground, wherein the growing chamber comprises an upper barrier, and wherein the upper barrier is mulch.

11. An irrigation device comprising a solar collector for collecting solar energy; a growing chamber and a heating element, the heating element being adapted to be in thermal contact with water having impurities, the growing chamber and the heating element being separated by a semi-permeable membrane; the irrigation device further comprising a heat conduit for transferring heat from the solar collector to the heating element to thereby cause water vapour to move across the membrane; the membrane being permeable to water vapour, but impermeable to said impurities so that the impurities remain whereas the water moves to the growing chamber, wherein the heating element is adapted to be inserted into the ground, wherein the growing chamber comprises an upper barrier, and wherein the upper barrier is perforated.

* * * * *